(12) United States Patent
Gur (10) Patent No.: US 9,332,585 B2
(45) Date of Patent: May 3, 2016

(54) NON-SYNCHRONIZED ADPCM WITH DISCONTINUOUS TRANSMISSION

(75) Inventor: Arie Gur, Kiryat Ono (IL)

(73) Assignee: DSP GROUP LTD., Herzliya (IL)

( * ) Notice: Subject to any disclaimer, the term of this patent is extended or adjusted under 35 U.S.C. 154(b) by 106 days.

(21) Appl. No.: 13/885,697

(22) PCT Filed: Nov. 18, 2010

(86) PCT No.: PCT/IL2010/000966
§ 371 (c)(1),
(2), (4) Date: May 16, 2013

(87) PCT Pub. No.: WO2012/066525
PCT Pub. Date: May 24, 2012

(65) Prior Publication Data
US 2013/0230111 A1 Sep. 5, 2013

(51) Int. Cl.
*H04B 14/04* (2006.01)
*H04B 1/06* (2006.01)
*H04W 76/04* (2009.01)
*H04B 14/06* (2006.01)

(52) U.S. Cl.
CPC .......... *H04W 76/048* (2013.01); *H04B 14/068* (2013.01)

(58) Field of Classification Search
USPC ................. 375/219, 220, 221, 222, 229–236, 375/240.26–240.29, 285, 284, 278, 295, 375/306, 307, 302, 316, 324, 325, 346, 350, 375/340, 339, 354, 358, 296, 297, 242–254, 375/256, 259, 262, 299, 347, 353, 362
See application file for complete search history.

(56) References Cited

U.S. PATENT DOCUMENTS

| | | | | |
|---|---|---|---|---|
| 4,517,596 | A * | 5/1985 | Suzuki | 375/240.05 |
| 5,559,832 | A | 9/1996 | Laird | |
| 5,873,058 | A * | 2/1999 | Yajima | G10L 19/173 704/201 |
| 7,995,674 | B2 * | 8/2011 | Hori et al. | 375/296 |
| 8,184,739 | B2 * | 5/2012 | Ohkawara et al. | 375/297 |
| 2004/0174899 | A1 * | 9/2004 | Rambo et al. | 370/465 |
| 2005/0141637 | A1 * | 6/2005 | Domokos | 375/296 |
| 2007/0237260 | A1 * | 10/2007 | Hori et al. | 375/296 |

(Continued)

FOREIGN PATENT DOCUMENTS

| | | |
|---|---|---|
| EP | 0798908 | 10/1997 |
| GB | 2290687 | 1/1996 |
| GB | 2290687 A * | 1/1996 |

*Primary Examiner* — Linda Wong
(74) *Attorney, Agent, or Firm* — Reches Patents (57) ABSTRACT

A method for coordinating an encoder and a decoder in a wireless communication system employing discontinuous transmission, the method comprising performing a syncless reset command on the encoder and the decoder, in order to bring the encoder and decoder into stable and compatible states. The syncless reset command can be implemented by setting the variables of the encoder and decoder into predetermined values, or by performing a normal reset command followed by encoding or decoding a predetermined number of predetermined sample values.

20 Claims, 6 Drawing Sheets

(56) References Cited

U.S. PATENT DOCUMENTS

| | | | |
|---|---|---|---|
| 2009/0264089 A1* | 10/2009 | Suzuki et al. | 455/114.3 |
| 2010/0197231 A1* | 8/2010 | Kenington | 455/63.1 |
| 2010/0225389 A1* | 9/2010 | Teetzel | 330/149 |
| 2010/0253426 A1* | 10/2010 | Su et al. | 330/149 |
| 2010/0260273 A1 | 10/2010 | Raifel et al. | |
| 2010/0295612 A1* | 11/2010 | Ohkawara et al. | 330/149 |
| 2011/0050339 A1* | 3/2011 | Ohkawara et al. | 330/149 |
| 2011/0096865 A1* | 4/2011 | Hori et al. | 375/295 |
| 2011/0150130 A1* | 6/2011 | Kenington | 375/296 |
| 2011/0235748 A1* | 9/2011 | Kenington | 375/296 |

* cited by examiner

NON-SYNCHRONIZED ADPCM WITH DISCONTINUOUS TRANSMISSION

RELATED APPLICATIONS

This application claims priority under 35 U.S.C. 371 as a national stage filing of application no: PCT/IL2010/000966 filed on Nov. 18, 2010 and published as WO 2012/066525 the disclosure of which is incorporated herein by reference.

TECHNICAL FIELD

The present disclosure relates to wireless communication in general, and to a method and system for implementing non-synchronized ADPCM with discontinuous transmission (DTX), in particular.

BACKGROUND

Consumer products such as communication devices and in particular wireless telephones have long become standard commodity.

In such systems, the transmitting side encodes the communicated data, while the receiving side decodes it. It will be appreciated that the transmitting and receiving sides may alternate according to the speaking side. Many of these devices use Adaptive Differential Pulse Code Modulation (ADPCM) codecs, which are waveform codecs, in which the encoder instead of quantizing the speech signal directly, quantizes the difference between the speech signal and a prediction that has been made of the speech signal. If the prediction is accurate then the difference between the real and predicted speech samples is of lower variance than the real speech samples, and is accurately quantized with fewer bits than would be needed to quantize the original speech samples. At the decoder side, the quantized difference signal is added to the predicted signal to give the reconstructed speech signal.

In order to improve and make the usage of the transmitting side and receiving side of a communication system more efficient, discontinuous transmission (DTX) may be used. DTX is a method for reducing transmission and thus optimizing the overall efficiency of wireless voice communications systems, by momentarily powering-down or muting any of the sides, when no voice activity is detected.

In a typical two-way conversation, each individual speaks on average slightly less than half of the time. If the transmitter signal is switched on only during periods of voice input, the duty cycle of the system can be cut to less than 50 percent on average. This conserves battery power and radiation, eases the workload of the components in the transmitter amplifiers, and reduces interference.

As explained above, in ADPCM the encoding and decoding are not stateless, but rather recently communicated data is used during encoding and decoding current data. Therefore, after the two sides do not communicate for a while, getting back into communication introduces a synchronization problem.

Some prior art solutions include halting all activity of the encoder and decoder so that they remain at the same state. The drawback of this solution is that it is hard to ensure that once communication resumes, encoding and decoding start at the same sample, since even a very small deviation causes severe noises.

Other solutions include encoding and decoding predetermined or artificial data such as null data. This solution is more stable, but still requires the encoder and decoder to fully operate even when there is no data is transmission.

Yet another solution relates to introducing comfort noise generated by a comfort noise generator (CNG) to the encoder and the decoder, and have the encoder and decoder operate on the comfort noise.

However, none of these solutions provides satisfactory synchronization as well as processing power savings by avoiding unnecessary encoding and decoding.

There is thus a need in the art for a method and system for synchronizing the two sides in ADPCM with TDX communication systems.

SUMMARY

In a communication system employing discontinuous transmission between an encoder unit and a decoder unit, coordinating the encoder unit and the decoder unit and the decoder after a silence period.

A first aspect of the disclosure relates to a method for coordinating an ADPCM-based encoder comprised in a transmitting unit of a communication system and an ADPCM-based decoder comprised in a receiving unit of the communication system after a silence period, wherein the communication system employs discontinuous transmission, the method comprising: the encoder performing a first syncless reset operation consequent to receiving audio data; the encoder operating on the audio data and setting one or more encoded values in a buffer of samples; the transmitting unit transmitting the content of the buffer of samples; the receiving unit receiving the content of the buffer of samples; the decoder performing a second syncless reset operation; and the decoder decoding the received content. Within the method, the first syncless reset operation or the second syncless reset operation optionally comprise setting internal variables of the encoder or the decoder to predetermined values. Within the method, the first syncless reset operation or the second syncless reset operation optionally comprises: the encoder or the decoder performing a normal reset operation; and the encoder or the decoder encoding or decoding a predetermined number of predetermined sample values. Within the method, the predetermined number is optionally equal to or larger than about 10. Within the method, the predetermined sample value is optionally '0' for the encoder and optionally 'F' for the decoder. The method can further comprise the decoder outputting the decoded received content. The method can further comprise the encoder setting one or more hardcoded values in the buffer of samples prior to performing the first syncless reset operation.

Another aspect of the disclosure relates to a communication system comprising a transmitting unit and a receiving unit, the communication system employing DTX between the transmitting side and the receiving side, the transmitting unit comprising: a voice activity detector (VAD) for identifying whether an input signal is voiced or silent and transmitting a VAD signal indicating whether the input signal is voiced or silent; an ADPCM-based encoder, comprising a syncless reset component for executing a first syncless reset command when the VAD signal indicates that the input signal changed from silent to voiced; the receiving unit comprising: an ADPCM-based decoder, comprising a syncless reset component for executing a second syncless reset command when the VAD signal indicates that the input signal changed from silent to voiced. Within the communication the encoder or decoder are optionally adapted to set internal variables of the encoder or the decoder to predetermined values for executing the first syncless reset command or the second syncless reset command. Within the communication system, for executing the first syncless reset command or the second syncless reset command the encoder or decoder are optionally adapted to: performing a normal reset command; and encoding or decoding a predetermined number of predetermined sample values. Within the communication system, the predetermined number is optionally equal to or larger than about 10. Within the communication system, the predetermined sample value is optionally '0' for the encoder and optionally 'F' for the decoder. Within the communication system, the receiving unit can further comprise: a comfort noise generator for generating comfort noise when the input signal is silenced; and a switch for activating the ADPCM-based decoder when the input signal is voiced, and the comfort noise generator when the input signal is silent. Within the communication system, the encoder is optionally adapted to set one or more hard-coded value in the buffer of samples prior to performing the first syncless reset command.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

A method and communication device which provide unsynchronized reset (syncless reset) commands in order to coordinate the transmitter and receiver in a device having a transmitting side and a receiving side which communicate in Adaptive Differential Pulse Code Modulation (ADPCM) with TDX protocol. When DTX methods are used, transmission is stopped when no audio is input, the encoder on the transmitting side can keep updating its state when silent samples and then voiced samples are received, while the decoder on the receiving side can not do the same, and synchronization is lost.

The syncless reset command causes the encoder at the transmitting side and the decoder at the receiving side to achieve a stable point after a period of silence, by bringing the encoder and the decode to stable compatible states, such that the output signal is the same as the original one. The need arises since after a period of silence, the encoder and decoder may be at different and therefore non-compatible internal states, which cause the decoder to decode the encoded signal into a signal significantly different than the original signal, which may cause noises and "clicks", since the system diverges.

When a normal reset command is sent to a vocoder, i.e., an encoder or decoder, the vocoder has to process 64 samples of silence in order to reach a stable point.

In order to imitate that effect, the syncless reset can be implemented in a number of options. A first implementation comprises setting the internal variables of the vocoder into the same values, as would be obtained after processing 64 samples of silence consequent to a normal reset command.

Another option relates to each vocoder upon receiving a syncless reset command, artificially processing a predetermined number of artificial silent samples, whether these samples have been received or not. It will be appreciated that processing about 64 samples will reach the desired effect, similarly to the normal reset command. However, processing a lower number, e.g., 10 samples consequent to the normal reset command will practically provide a stable result as well. It will be appreciated that once a syncless reset command has been received, processing the predetermined number of samples can be performed without delay since the vocoder is not processing real incrementally-arriving data but rather predetermined data.

Figure 1:
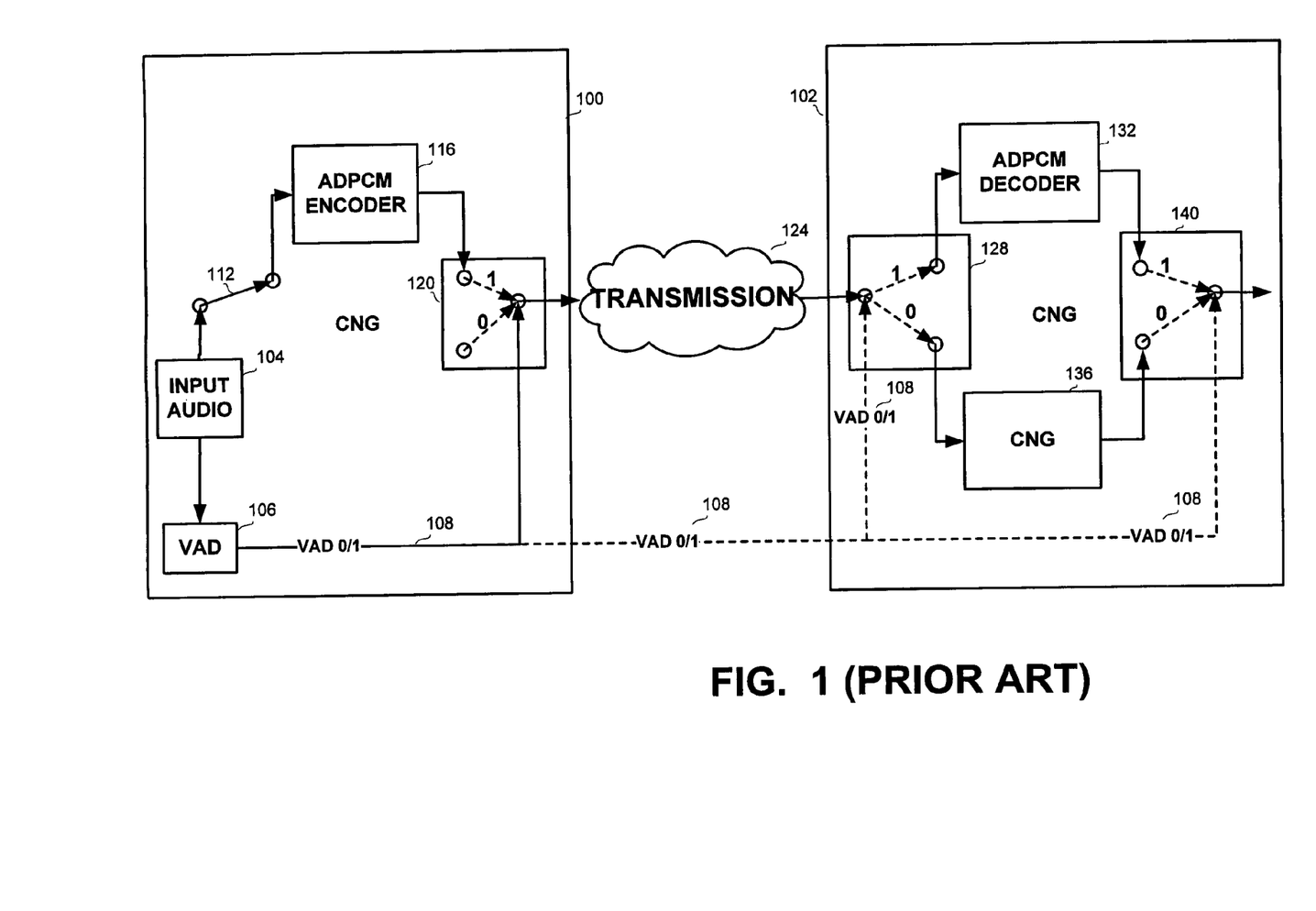
FIG. 1 is a general scheme of a communication system comprising a fixed part and a portable part.

Referring now to FIG. 1, showing a schematic illustration of a prior art communication device, comprising a transmitting unit 100 and a receiving unit 102. If the communication device comprises a fixed unit and a portable unit, then either one of them is transmitting at times and receiving at times.

Transmitting unit 100 comprises an ADPCM-based encoder 116, and receiving unit 102 comprises an ADPCM-based decoder 132. Encoder 116, once in stable state, encodes a '0' input sample into an 'F' sample. On the receiving side, decoder 132, once in stable state, decodes a received 'F' sample into an output '0' sample.

Transmitting unit 100 receives input signal 103, which is processed by voice activity detection (VAD) unit 104 which detects whether the input signal is voiced or silent, and issues corresponding VAD 0/1 signal 108, which is for example 1 if audio is detected, and 0 otherwise.

The speech is processed by ADPCM encoder 116, and the output is transferred to switch 120 which also receives VAD 0/1 signal 108. If VAD 0/1 signal 108 is indicates voiced input, the output of ADPCM encoder 116, is transmitted to receiving unit 102. When DTX is used, if VAD 0/1 signal 108 indicates silent input, transmission can be eliminated.

On receiving unit 102, if VAD 0/1 signal 108 indicates voiced input, the signal is transferred to switch 128. If VAD 0/1 signal 108 indicates voiced input, the received signal is passed to ADPCM decoder 132 which decodes the signal. If VAD 0/1 signal 108 indicates silent input 0, comfort noise is generated by comfort noise generator (CNG) 136.

In accordance with the value of VAD 0/1 signal 108, switch 140 selects for output either the decoded audio or the generated comfort noise.

Figure 2:
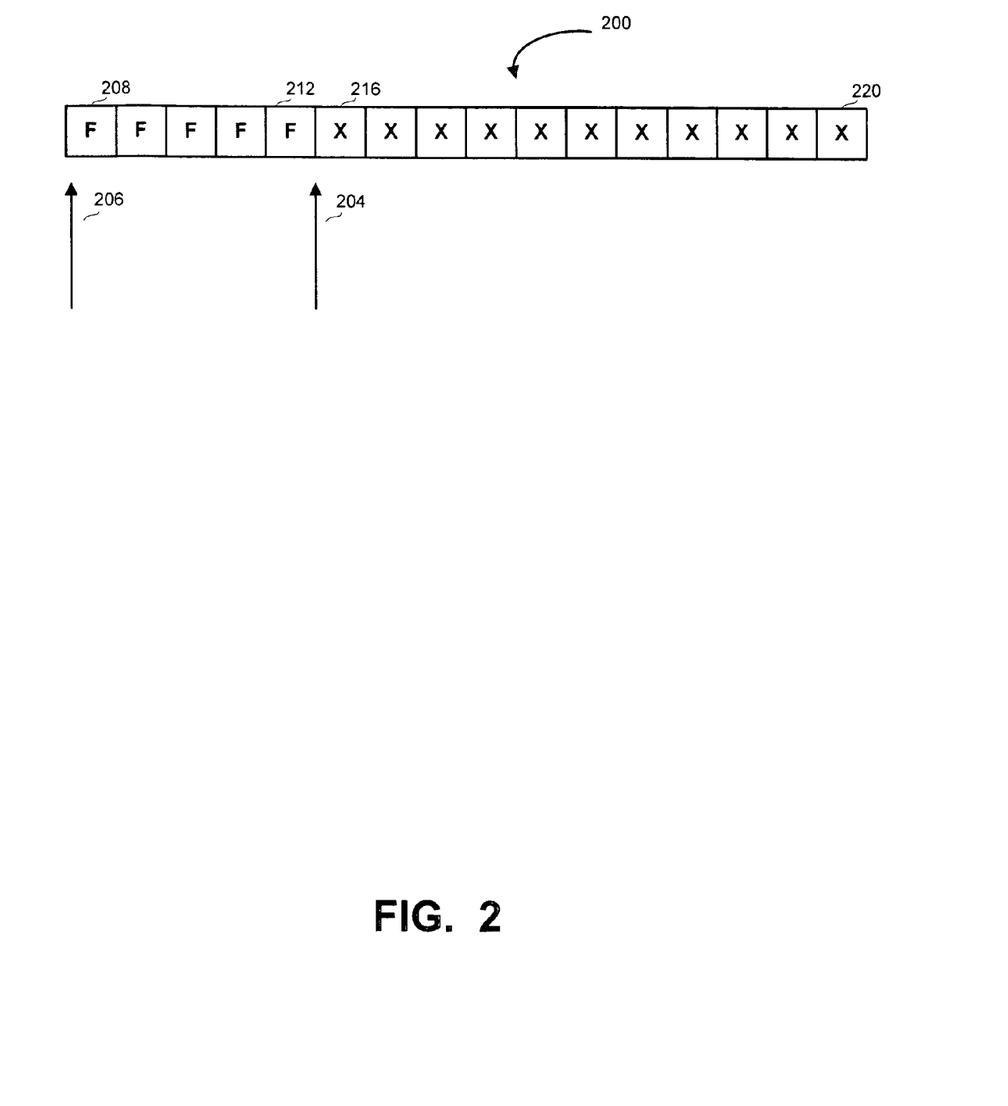
FIG. 2 is a schematic illustration of the synchronization problem between the fixed part and the portable part when DTX communication is used.

Referring now to FIG. 2, showing a schematic illustration of the synchronization problem between transmitting unit 100 and receiving unit 102 when using DTX.

Data transfer between transmitting unit 100 and receiving unit 102 is generally in bulks of a predetermined number of samples, e.g., 80 samples. ADPCM encoder 116 processes the incoming signal, writes a value corresponding to each sample in the bulk, and when the bulk is full transmits it to the receiving side.

As long as no voice is detected by VAD unit 104, ADPCM encoder 116 places a predetermined hard-coded value, for example 'F' (0x1111) for each sample, such as locations 208 . . . 212 of bulk 200. Once speech is detected and ADPCM-based encoder 116 starts receiving audio at time indicated by arrow 204, encoder 116 continues to fill bulk 200 with actual encoded data X within locations 216 . . . 220. It will be appreciated that X does not relate to a particular value but rather denotes changing values stored within locations 216 . . . 220. It will be appreciated that one or more X values can be equal to 'F'. In particular, even the first sample after the silence can have a value of 'F', which makes it undifferentiable from the silent 'F's preceding it.

Once bulk 200 is full, it is transmitted to receiving unit 102, which is thus notified that communication is resumed. Receiving unit 102 is, however, unaware of when transmitting unit 100 started receiving audio, and can therefore not determine when to start processing the received bulk, since each 'F' can be a predetermined value or an actual value. Thus, transmitting unit 100 and receiving unit 102 are not synchronized which may result in non-matching states and output signal that is significantly different from the input signal.

Figure 3:
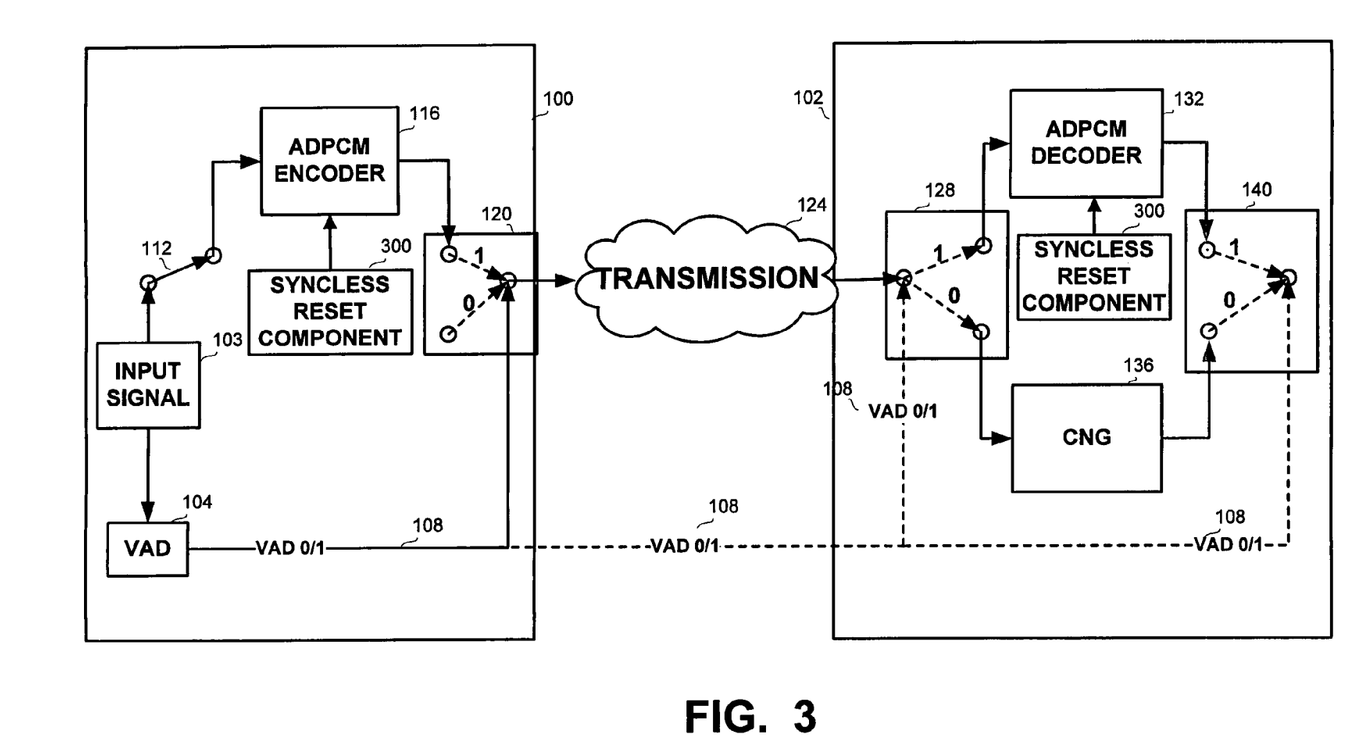
FIG. 3 is a general scheme of a communication system comprising a transmitting side and a receiving side, with a syncless reset, in accordance with the disclosure.

Referring now to FIG. 3, showing a schematic illustration of a solution to the synchronization problem. The system comprises transmitting unit 100 and receiving unit 102 as in FIG. 1. In addition, as the transmission mode changes from "Off" to "On", each of encoder 116 and decoder 132 execute a syncless reset command by syncless reset component 300 which performs operations as detailed below. It will be appreciated that component 300 can be implemented using software, and/or hardware and/or firmware or any other known technology.

In some embodiments, encoder 116 and decoder 132 always run on real data: the encoder encodes only real signal, while the decoder runs on real data when transmission is on, and on arbitrary data generated by comfort noise generator 136 when transmission is off. Thus, no null samples are input into encoder 116 or decoder 136. In alternative embodiments, encoder 116 and decoder 136 can avoid running when transmission is off. In any case, it does not matter whether the encoder and decoder operate or not. Further, if the encoder and decoder do work, it does not matter what data they work on, and there is no requirement for running on particular data.

The syncless reset command is aimed at bringing the encoder and the decoder to stable and compatible states, whatever data they were running on before, at which states their variables are not changed if the input is '0' for the encoder or 'F' for the decoder, no matter how long the 'F' or '0' sequence is.

Figure 4A:
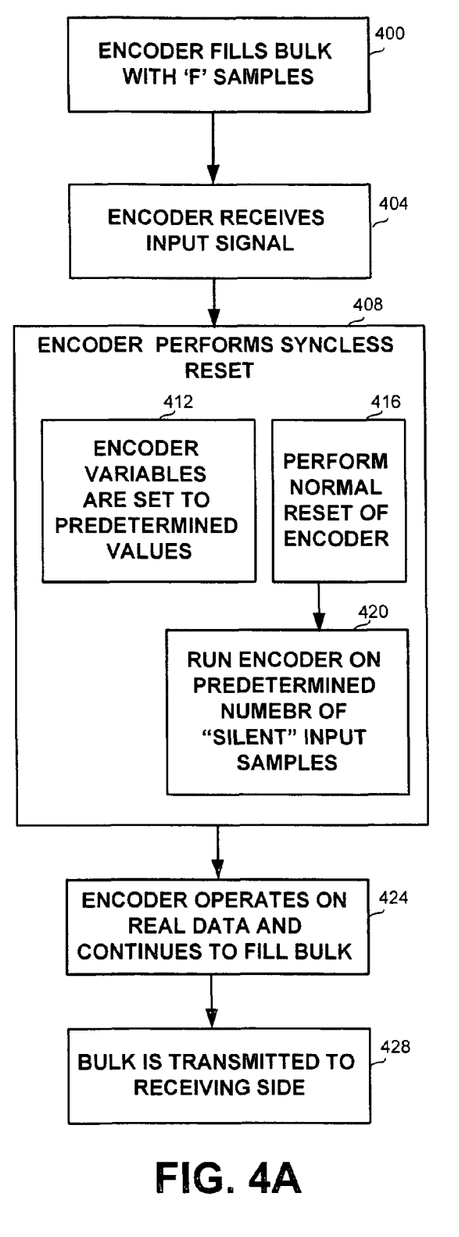
FIG. 4A is a flowchart of the operation of the transmitting side when syncless reset is used, in accordance with the disclosure.
Figure 4B:
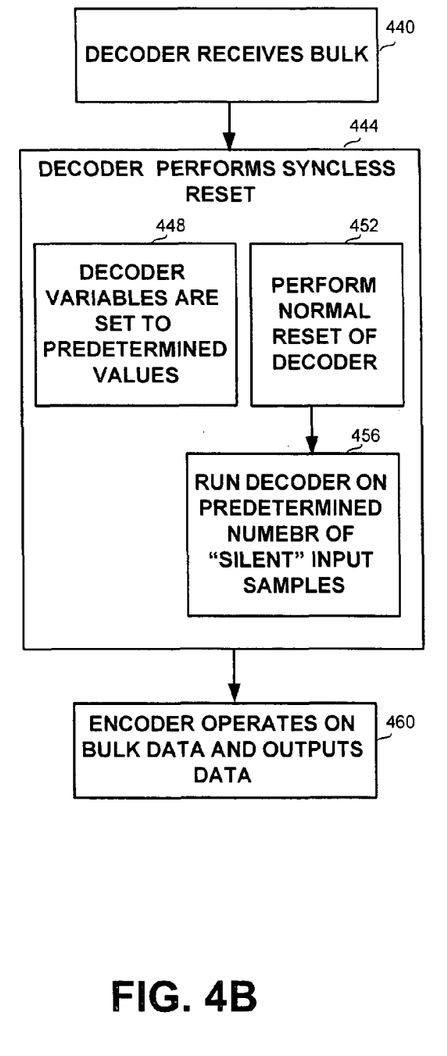
FIG. 4B is a flowchart of the operation of the receiving side when syncless reset is used.

Referring now to FIGS. 4A and 4B, showing schematic flowcharts of methods for coordinating the transmitting and receiving sides after a silent period.

FIG. 4A shows a schematic flowchart of the operation of the transmitting side. On step 400 which is continuously occurring during the silent period, the encoder fills a buffer or a bulk with values indicating silence, such as 'F's.

On step 404 the encoder starts receiving an input signal, for example once VAD detected voiced input. On step 408 the encoder performs a syncless reset command. The syncless reset command places the encoder in the same stable point as achieved after a long period of silence input.

The syncless reset command can be performed in a number of embodiments. In one embodiment, comprising step 412, the encoder sets its variables into a set of predetermined values, which are substantially the same values as those obtained after the encoder has processed a number of '0' input samples. The variable names, their values in normal reset command, and the values in the syncless reset command are detailed on table 1. Table 2, however, lists only the variables whose assigned values differ between a normal reset command and a syncless reset command. The other values are the same as in the normal reset command, as provided by the current or future ITU G.726 standard for ADPCM for the normal reset operation.

TABLE 1

| Variable name | Value in normal reset operation | Value in syncless reset operation |
|---|---|---|
| inp_buf | 0x004417b0 | 0x004417b0 |
| out_buf | 0x00441580 | 0x00441580 |
| smpno | 0x00000100 | 0x00000100 |
| law | 0x0012fe40 "2" | 0x0012fe40 "2" |
| rate | 0x0004 | 0x0004 |
| r | 0x0000 | 0x0000 |
| state | 0x0012ff18 | 0x0012ff18 |
| sr0 | 0x0020 | 0x0020 |
| sr1 | 0x0020 | 0x0020 |
| a1r | 0x0000 | 0x0000 |
| a2r | 0x0000 | 0x0000 |
| b1r | 0x0000 | 0x0000 |
| b2r | 0x0000 | 0x0000 |
| b3r | 0x0000 | 0x0000 |
| b4r | 0x0000 | 0x0000 |
| b5r | 0x0000 | 0x0000 |
| b6r | 0x0000 | 0x0000 |
| dq5 | 0x0020 | 0x0420 |
| dq4 | 0x0020 | 0x0420 |
| dq3 | 0x0020 | 0x0420 |
| dq2 | 0x0020 | 0x0420 |
| dq1 | 0x0020 | 0x0420 |
| dq0 | 0x0420 | 0x0420 |
| dmsp | 0x0000 | 0x0000 |
| dmlp | 0x0000 | 0x0000 |
| apr | 0x0020 | 0x01f1 |
| yup | 0x0220 | 0x0220 |
| tdr | 0x0000 | 0x0000 |
| pk0 | 0x0000 | 0x0000 |
| pk1 | 0x0000 | 0x0000 |
| ylp | 0x00008800 | 0x00008800 |
| u4 | 0x0001 | 0x0000 |
| b1 | 0x0000 | 0x0000 |
| a2t | 0x0000 | 0x0000 |
| dms | 0x0000 | 0x0000 |
| dqs | 0x0001 | 0x0001 |
| tdp | 0x0000 | 0x0000 |
| dx | 0xcccc | 0xcccc |
| u3 | 0x0001 | 0x0000 |
| wb6 | 0x0000 | 0x0000 |
| u2 | 0x0001 | 0x0000 |
| pk2 | 0x0000 | 0x0000 |
| wb5 | 0x0000 | 0x0000 |
| sez | 0x0000 | 0x0000 |
| dsx | 0xcccc | 0xcccc |
| wi | 0x0ff4 | 0x0ff4 |
| u1 | 0x0001 | 0x0000 |
| a2 | 0x0000 | 0x0000 |
| b2p | 0x0000 | 0x0000 |
| b6p | 0x0000 | 0x0000 |
| wb4 | 0x0000 | 0x0000 |
| td | 0x0000 | 0x0000 |
| a1 | 0x0000 | 0x0000 |
| a2p | 0x0000 | 0x0000 |
| a1t | 0x0000 | 0x0000 |
| wb3 | 0x0000 | 0x0000 |
| ap | 0x0000 | 0x01f1 |
| sr2 | 0x0020 | 0x0020 |
| wb2 | 0x0000 | 0x0000 |
| yut | 0x0203 | 0x0203 |
| j | 0x00000001 | 0x00000041 |
| i | 0x000f | 0x000f |
| y | 0x0220 | 0x0220 |
| tr | 0x0000 | 0x0000 |
| dlnx | 0xcccc | 0xcccc |
| wb1 | 0x0000 | 0x0000 |
| se | 0x0000 | 0x0000 |
| dqln | 0x0800 | 0x0800 |
| b5p | 0x0000 | 0x0000 |

TABLE 1-continued

| Variable name | Value in normal reset operation | Value in syncless reset operation |
|---|---|---|
| dml | 0x0000 | 0x0000 |
| dql | 0x0888 | 0x0888 |
| sd | 0xcccc | 0xcccc |
| slx | 0xcccc | 0xcccc |
| yl | 0x00008800 | 0x00008800 |
| fi | 0x0000 | 0x0000 |
| dq | 0x8000 | 0x8000 |
| a1p | 0x0000 | 0x0000 |
| b1p | 0x0000 | 0x0000 |
| app | 0x0020 | 0x01f1 |
| al | 0x0000 | 0x0040 |
| wa2 | 0x0000 | 0x0000 |
| sigpk | 0x0001 | 0x0001 |
| sr | 0x0000 | 0x0000 |
| wa1 | 0x0000 | 0x0000 |
| b6 | 0x0000 | 0x0000 |
| b4p | 0x0000 | 0x0000 |
| sp | 0xcccc | 0xcccc |
| b5 | 0x0000 | 0x0000 |
| so | 0x0000 | 0x0000 |
| ax | 0x0001 | 0x0001 |
| b4 | 0x0000 | 0x0000 |
| dq6 | 0x0020 | 0x0420 |
| u6 | 0x0001 | 0x0000 |
| b3 | 0x0000 | 0x0000 |
| dlx | 0xcccc | 0xcccc |
| yu | 0x0220 | 0x0220 |
| u5 | 0x0001 | 0x0000 |
| b2 | 0x0000 | 0x0000 |
| b3p | 0x0000 | 0x0000 |

TABLE 2

| Variable name | Value in normal reset operation | Value in syncless reset operation |
|---|---|---|
| u4 | 0x0001 | 0x0000 |
| dqs | 0x0001 | 0x0001 |
| u3 | 0x0001 | 0x0000 |
| u2 | 0x0001 | 0x0000 |
| u1 | 0x0001 | 0x0000 |
| ap | 0x0000 | 0x01f1 |
| app | 0x0020 | 0x01f1 |
| al | 0x0000 | 0x0040 |
| dq6 | 0x0020 | 0x0420 |
| u6 | 0x0001 | 0x0000 |
| u5 | 0x0001 | 0x0000 |

It will be appreciated that for some variables setting values substantially similar to the values shown for the syncless reset operation in Table 1 can also provide stable results, and is also covered by the present disclosure. For example, the "al" variable is a counter and can be set to any value.

In another embodiment, normal reset is performed by the encoder on step 416, followed by processing a predetermined number of '0' input samples on step 420. The predetermined number can be between about 10 and about 64, after which the encoder assumes a substantially stable state not affected by subsequent '0' samples. It will be appreciated that since the processing is not performed upon real data but upon predetermined values, it can be completed in a fraction of the time it would take to process the same number of real input sample, and would thus not cause any additional delay beyond the delay of a system without Syncless reset.

Once the encoder is at a stable state, on step 424 it continues to process the actual audio data received and to fill the buffer, and on step 428 when the bulk is full, the bulk is transmitted to the receiving side. The bulk may thus comprise a number of 'F' samples generated due to no audio input, followed by a number of real data samples.

FIG. 4B shows a schematic flowchart of the operation of the receiving side. On step 440 the decoder receives a first bulk after a silence period in which no transmissions were received.

On step 444 the decoder performs syncless reset, in order to achieve a stable state, so that regardless of the number of 'F' samples in the received bulk, the encoder will be in the same stable point as achieved after processing a long period of silent input.

The syncless reset, similarly to the syncless reset performed by the transmitting side on step 408, can be performed in a number of embodiments. In one embodiment, comprising step 448, the decoder sets its variables into a set of predetermined values, which are substantially the same values as those obtained after the decoder has processed a number of 'F' input samples. The values are substantially identical to the values of the variables in the encoder as set on step 412.

Alternatively, in another embodiment, normal reset is performed by the decoder on step 452, followed by processing a predetermined number of 'F' input samples on step 456. The predetermined number can be between about 10 and about 64, after which the decoder assumes a substantially stable state not affected by subsequent 'F' samples. It will be appreciated that since the processing is not performed upon real data but upon predetermined values, it can be completed in a fraction of the time it would take to process the same number of real input samples, and would thus not cause delay.

Once the decoder is in a stable state, on step 460 the decoder operates on the received bulk, and remains stable, and thus in accordance with the state the encoder was at when encoding the signal, no matter how many 'F' samples are at the beginning of the bulk, resulting from the silent period.

The syncless reset operation solves matching and coordination issues between the encoder and decoder, since the encoder and decoder are at the same state when encoding and decoding the real audio data, no matter how many predetermined samples are at the beginning of the transmitted bulk.

If a normal reset command was used instead of the described syncless reset, a noise such as a loud "click" would sound on the receiving side due to the lack of synchronization and the difference in states between the encoder and decoder. The disclosed embodiments also provide for faster stabilization time after the reset.

Figure 5:
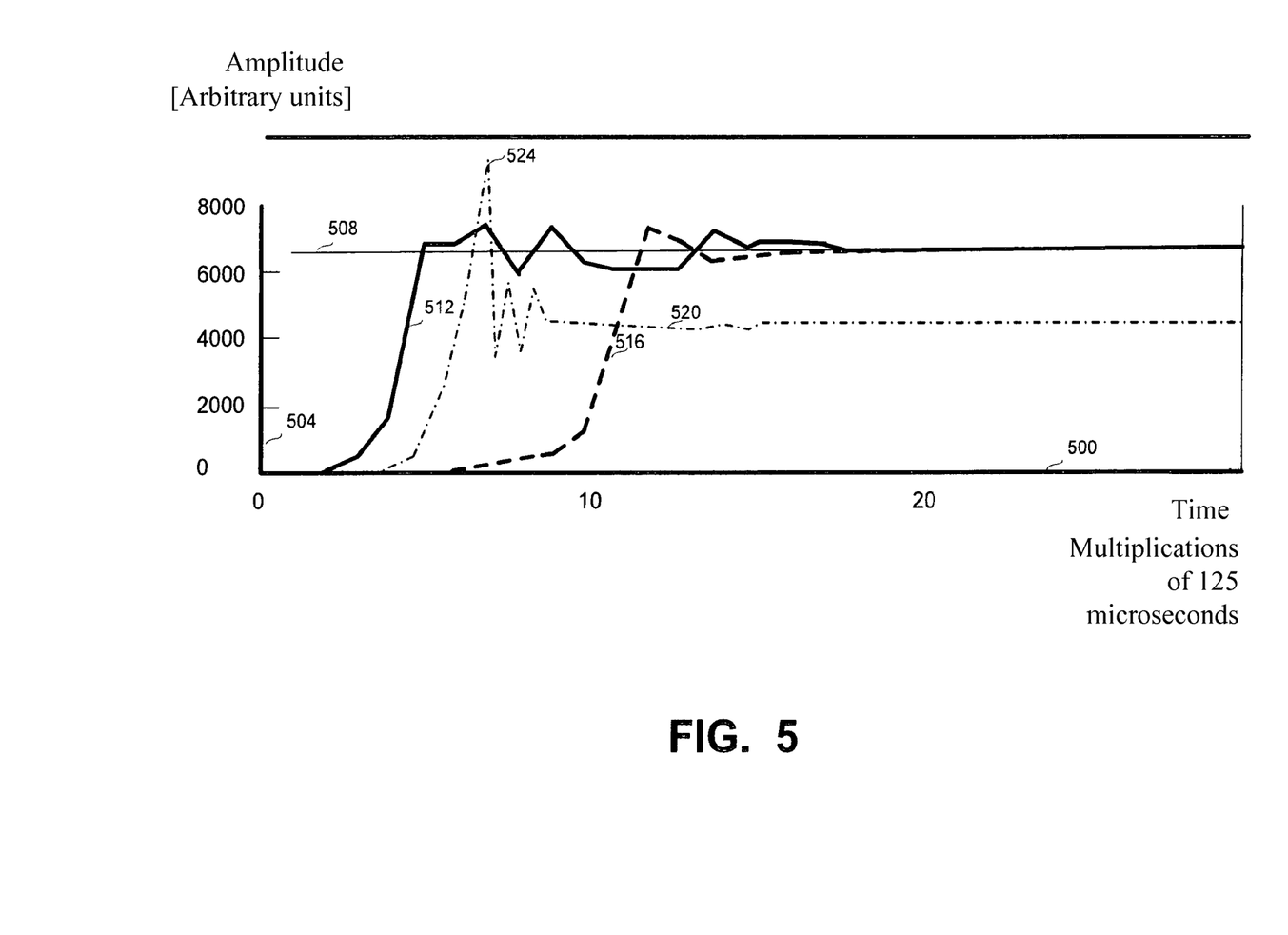
FIG. 5 is a graph comparing the performance of the syncless reset with other methods for a step signal.

Referring now to FIG. 5, showing graphs demonstrating the convergence of the output signal to the original signal for a step input signal, when using the normal reset method and when using the syncless reset method. The original signal is denoted 508, and the signal following a syncless reset as described above is denoted 512. In comparison, the signal after a synchronized normal reset is denoted 516, and the signal after a non-synchronized normal reset, i.e. when there is a mismatch of at least one sample between the encoder and the decoder is denoted 520. It is seen that the syncless reset provides for faster stabilization than the synchronized normal reset. It is also seen that the non-synchronized normal reset, as shown by line 520 provides even worse convergence rate and higher levels of noise than synchronized normal reset. The non-synchronized normal reset first causes a spike 524, and then converges to a wrong signal, which may happen even because of a single sample mismatch. Signal 512, showing the convergence of the output signal to the original signal following a syncless reset command does not change, regardless of the length of the sample mismatch.

Figures 6A, 6B, 6C:
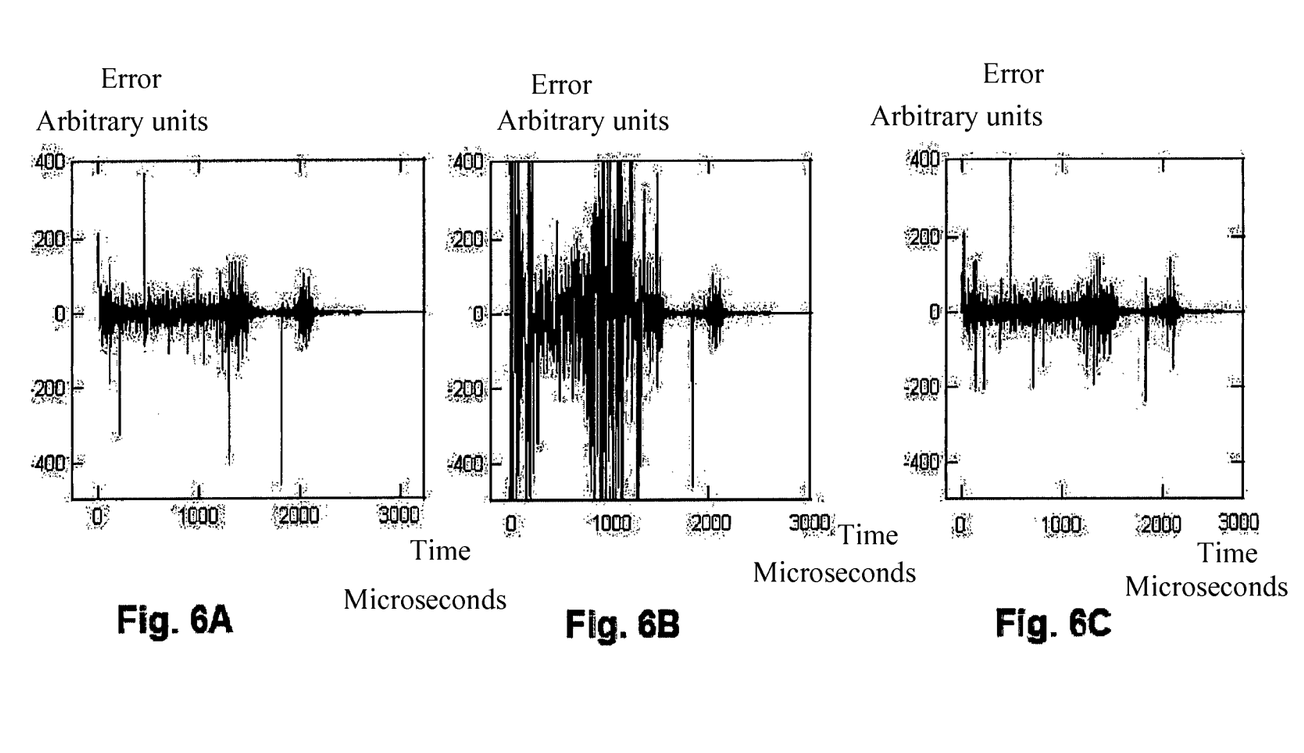
FIGS. 6A-6C show graphs comparing the performance of the syncless reset with other methods for a speech signal, in accordance with the disclosure.

Referring now to FIGS. 6A-6C, showing the errors resulting in different algorithms for a speech signal. FIG. 6A shows the error between an input speech signal and the signal output when using the normal reset command when the encoder and decoder are fully synchronized.

FIG. 6B shows the error between the input speech signal and the output signal when using the normal reset command when the encoder and decoder are not synchronized, i.e. the encoder and decoder operate on sequences differing in at least one sample, and FIG. 6C shows the error between the input speech signal and the output signal when using the syncless reset command. The graph shown in FIG. 6C will not change regardless of the length of the sample mismatch.

For speech signal, the syncless reset command provides convergence which is about as fast and as good as the normal reset when synchronized, and much better performance, including lack of spikes, than the normal reset command when the encoder and decoder are not synchronized.

In addition to fast and good stabilization, the syncless reset also provides for similar performance regardless of possible mismatch between the encoder and decoder, i.e., no matter how many artificial or hard-coded 'F' samples are at the beginning of the transmitted bulk, the output stabilizes just the same.

The disclosed methods provide for solving the problem of lack of synchronization between an encoder and a decoder in discontinuous transmission. The problem is caused since the encoder first fills a bulk to be transmitted with artificial or hard-coded data, and once audio input is received continues to fill the bulk with real data; the decoder however, starts operating once it receives the bulk, but can not know where exactly in the bulk the hard-coded data ends and the real data begins. Thus, the encoder and decoder may not be in the same state when the real data starts, resulting in a signal output by the decoder which may be significantly different from the signal input into the encoder.

The disclosed methods provide for bringing the encoder and the decoder into identical and stable states, which are the same states that are achieved after long periods of silence, so that no matter how many hard-coded sample values are there at the beginning of the bulk, the output signal converges quickly to the input signal. The disclosed methods provide high stability of the encoder and decoder, and even a mismatch in the number of artificial values entered to the encoder and to the decoder do not cause the system to divert, unlike regular reset, in which an incompatible number of artificial values causes changes in the internal parameters and therefore loss of synchronization. This is achieved without stopping the encoder or the decoder, and without feeding the system with any required values.

It will be appreciated that the disclosed arrangement is not limited to any type of devices, and can be used also for any other environments, devices or audio devices such as wireless communication devices, IP communication devices, recorder, player, phone, baby monitor, security device, media recorder or player, voice over IP devices, or the like. It will also be appreciated that the disclosed methods include setting the encoder and decoder into values close to the values shown in table 1 above, which may also provide good estimation of a stable state.

It will be appreciated that the disclosure can be implemented using software, and/or hardware and/or firmware or any other known technology. The parameters can either be set directly to the values detailed above, or by using a normal reset command followed by processing 10-64 silence samples, having for example values of '0' for the encoder and 'F' for the decoder.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. In a communication system comprising a transmitting unit including an Adaptive Differential Pulse Code Modulation (ADPCM)-based encoder and a receiving unit including an ADPCM-based decoder, the communication system employing discontinuous transmission (DTX), a method for coordinating the ADPCM-based encoder and the ADPCM-based decoder after an end of a silence period during which the transmitting unit did not transmit, the method comprising:
the ADPCM-based encoder performing a first syncless reset operation in response to a first reception of audio data after the end of the silence period;
the ADPCM-based encoder operating on the audio data and setting at least one encoded value in a buffer of samples;
the transmitting unit transmitting the content of the buffer of samples; the receiving unit receiving the content of the buffer of samples;
the ADPCM-based decoder performing a second syncless reset operation in response to the reception of the content of the buffer samples; and the decoder decoding the received content;
wherein said first syncless reset operation comprises setting internal variables of the ADPCM-based encoder into same values as would be obtained after performing, by the ADPCM-based encoder, a normal reset operation and encoding a predetermined number of ADPCM-based encoder samples having a predetermined ADPCM-based encoder sample value;
wherein said second syncless reset operation comprises setting internal variables of the ADPCM-based decoder respectively into same values as would be obtained after performing, by the ADPCM-based decoder, a normal reset operation and decoding a predetermined number of ADPCM-based decoder samples having a predetermined ADPCM-based decoder sample value.

2. The method of claim 1, wherein the predetermined number equals 10.

3. The method of claim 1, wherein the predetermined ADPCM-based encoder sample value is '0' and wherein the predetermined ADPCM-based encoder sample value is 'F'.

4. The method of claim 1, further comprising the ADPCM-based decoder outputting the decoded received content.

5. The method of claim 1, further comprising the ADPCM-based encoder setting at least one hard-coded value in the buffer of samples prior to performing the first syncless reset operation.

6. A communication system comprising a transmitting unit and a receiving unit, the communication system employing discontinuous transmission (DTX) between the transmitting side and the receiving side, the transmitting unit comprising:
a voice activity detector (VAD) for identifying whether an input signal is voiced or silent and transmitting a VAD signal indicating whether the input signal is voiced or silent;
wherein the transmitting unit is configured not to transmit during a silence period during which the input signal is silent;
an Adaptive Differential Pulse Code Modulation (ADPCM)-based encoder, comprising a first syncless reset component for executing a first syncless reset operation when the VAD signal indicates that the input signal changed from silent to voiced; the receiving unit comprising: an ADPCM-based decoder, comprising a second syncless reset component for executing a second syncless reset operation when first receiving a content of buffer samples from the transmitter after an end of the silence period; and wherein said first syncless reset component is configured to set internal variables of the ADPCM-based encoder into same values as would be obtained after performing a normal reset operation and encoding a predetermined number of ADPCM-based encoder samples having a predetermined ADPCM-based encoder sample value;

wherein said second syncless reset component is configured to set internal variables of the ADPCM-based decoder respectively into same values as would be obtained after performing, by the ADPCM-based decoder, a normal reset operation and decoding a predetermined number of ADPCM-based decoder samples having a predetermined ADPCM-based decoder sample value.

7. The communication system of claim 6, wherein the predetermined number equals 10.

8. The communication system of claim 6, wherein the predetermined ADPCM-based encoder sample value is '0' and wherein the predetermined ADPCM-based encoder sample value is 'F'.

9. The communication system of claim 6, wherein the receiving unit further comprises: a comfort noise generator for generating comfort noise during the silence period; and a switch for activating the ADPCM-based decoder after the silence period ends, and for activating the comfort noise generator during the silence period.

10. The communication system of claim 6, wherein the ADPCM-based encoder is adapted to set at least one hard-coded value in the buffer of samples prior to performing the first syncless reset operation.

11. The method of claim 1, wherein the predetermined number is equal to or larger than 64.

12. The communication system of claim 6, wherein the predetermined number is equal to or larger than 64.

13. The method according to claim 1, comprising closing the ADPCM-based encoder and the ADPCM-based decoder during the silence period.

14. The method according to claim 1, comprising encoding by the ADPCM-based encoder only audio data that is real.

15. The method according to claim 1, wherein the second syncless reset operation is executed without feeding the receiver required values of content of the buffer of samples.

16. The method according to claim 1, wherein a duration of the first syncless reset operation is a fraction of a duration required to decode, by the ADPCM-based decoder, an amount of real samples that equals the predetermined number of ADPCM-based decoder samples.

17. The communication system of claim 6, wherein the ADPCM-based encoder and the ADPCM-based decoder are closed during the silence period.

18. The communication system of claim 6, wherein the ADPCM-based encoder is configured to encode only audio data that is real.

19. The communication system of claim 6, wherein the second syncless reset component is configured to perform the second syncless reset operation is executed without feeding the receiver required values of content of the buffer of samples.

20. The communication system of claim 6, wherein a duration of the first syncless reset operation is a fraction of a duration required to decode, by the ADPCM-based decoder, an amount of real samples that equals the predetermined number of ADPCM-based decoder samples.

\* \* \* \* \*